Patented June 6, 1950

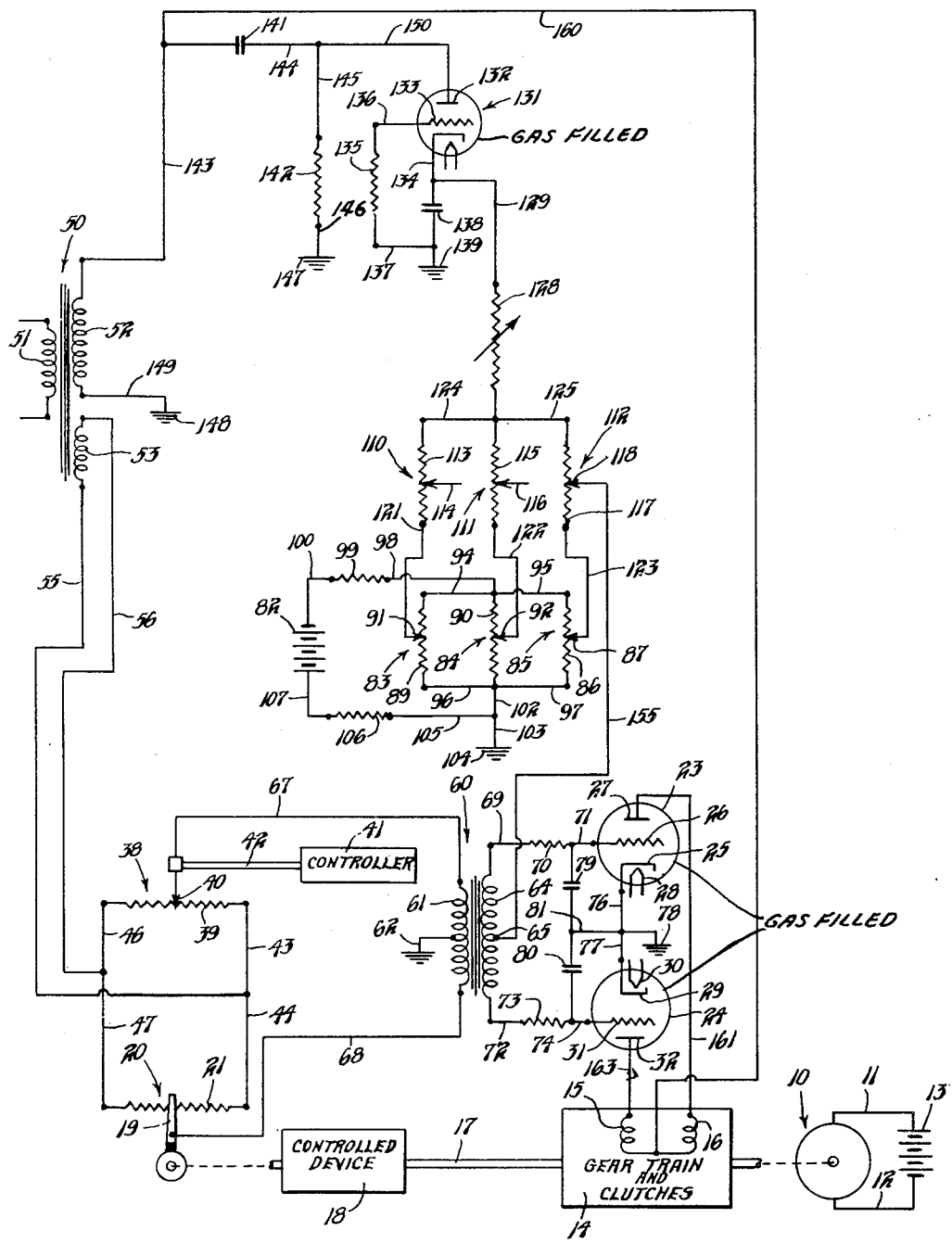

2,510,707

UNITED STATES PATENT OFFICE 2,510,707

AMPLIFIER WITH PULSATING BIAS

David L. Markusen, Los Angeles, Calif., assignor to Minneapolis-Honeywell Regulator Company, Minneapolis, Minn., a corporation of Delaware Application October 28, 1944, Serial No. 560,798

18 Claims. (Cl. 250—27)

The present invention is concerned with an amplifier and particularly with one wtih which gas filled electronic discharge devices are used.

An object of the present invention is to provide an electron amplifier of extreme sensitivity in which the effect of a signal voltage is periodically changed in amplitude by an electronic arrangement.

A still further object of the present invention is to provide such a system in which the signal voltage is a cyclically varying voltage such as an alternating one.

A further object of the invention is to provide such a system in which the periodic change in magnitude of the signal voltage is controlled by an electronic timing arrangement.

A still further object of the present invention is to provide such an arrangement in connection with a system in which there are two output discharge devices, one or the other of which is selectively energized in accordance with the phase relation of the signal voltage with respect to a standard voltage.

A further object of the present invention is to provide in connection with a system such as set out in the last object, means to suppress signals tending to travel longitudinally through the system to affect undesirably both discharge devices equally.

Other objects of the invention will be apparent from a consideration of the accompanying specification, claims, and drawing, of which The single figure is a schematic view of my invention applied to a motor control system.

Referring to Figure 1 of the drawing, the motor forming a part of the motor means to be controlled is indicated by the reference numeral 10. This motor may be of any conventional form of direct current motor which continually rotates in one direction upon a direct current being passed therethrough. The motor is connected by conductors 11 and 12 to a battery 13 or to any other suitable source of unidirectional voltage. The motor 10 is designed to form the driving unit of a servo motor assembly having a reduction gear train and clutches for causing a driven shaft to be driven in one direction or the other. For purposes of simplification, the mechanism including the gear train and clutches has not been shown but is merely designated in its entirety by the reference numeral 14. The clutches are in the form of a pair of electromagnetic clutches, one or the other of which is energized. The electromagnetic windings of these clutches are designated in the drawing by the reference connections 15 and 16. When winding 15 is energized, one clutch is engaged and the motor is effective to rotate a shaft 17 in one direction. When electromagnetic winding 16 is energized, on the other hand, the other clutch is engaged and the shaft 17 is rotated in the opposite direction. The motor 10 and the assembly 14 together constitute a motor means functioning to provide reversible motor action. Any other suitable reversible motor could be employed.

The shaft 17 is connected to a suitable controlled device 18 which illustratively might be the operating mechanism for an airplane rudder. The shaft 17 is also connected to a slidable contact arm 19 of a potentiometer 20. The contact arm 19 is adapted slidably to engage resistance element 21.

The current flow through electromagnetic windings 15 and 16 is controlled by a pair of electronic discharge tubes 23 and 24. In the particular application which I contemplate, I have found it desirable to employ gas filled tubes. While the amplifier is primarily adapted for use with such tubes, it is to be understood that the invention is not necessarily so limited. The tube 23 comprises an indirectly heated cathode 25, a control grid 26, and an anode 27. Associated with the cathode 25 is a cathode heater 28 which is connected through means (not shown) to any suitable source of power. The tube 24 comprises an idirectly heated cathode 29 having a heater 30, a control grid 31, and an anode 32. While the tubes 23 and 24 may be of any suitable gas filled type, I have found the type 2050 gas filled tube particularly suitable for this purpose. This tube has a shield grid but for purposes of simplification, the shield grid has been omitted in the drawing. In use in my circuit, this shield grid would be connected directly to the cathode.

The operation of the tubes 23 and 24 is controlled by an impedance bridge including the potentiometer 20, previously described, and a control potentiometer 38. This control potentiometer comprises a resistor 39 and a slidable contact 40. The slidable contact 40 is adapted to be positioned by any suitable controller 41 to which it is connected by a link 42. The controller 41 may illustratively be the gyroscope in an aircraft for controlling the position of the rudder in order to keep the aircraft on the course for which the gyroscope is set. The right hand end of resistor 39 is connected to the right hand end of resistor 21 by conductors 43 and 44. The left hand end of resistor 39 is connected to the left hand end of resistor 21 by conductors 46 and 47.

Power is supplied to the impedance bridge and to the tubes 23 and 24 by a transformer 50. This transformer comprises a primary winding 51, a high voltage secondary winding 52, and a low voltage secondary winding 53. The primary winding 51 is connected to any suitable source of alternating power of the desired frequency. The secondary winding 53 is connected by conductors 55 and 56 to the junctions of conductors 43 and 44 and 46 and 47, respectively. The last named junctions constitute the input terminals of the bridge while the sliders 19 and 40 constitute the output terminals of the bridge.

The output voltage of the bridge is impressed upon the primary of a coupling transformer 60. This transformer comprises a primary 61 having a grounded center tap 62 and a secondary winding 64 having a center tap 65. The slider 40 of the bridge is connected by conductor 67 to the upper terminal of primary winding 61 while the slider 19 is connected by conductor 68 to the lower terminal of primary 61. The upper terminal of secondary 64 is connected through conductor 69, resistor 70 and conductor 71 to grid 26 of tube 23. The lower terminal of secondary 64 is connected by conductor 72, resistor 73, and conductor 74 to grid 31 of tube 24. The two cathodes 25 and 29 are connected together by conductors 76 and 77, the junction of these conductors being connected to ground at 78. A condenser 79 is connected between grid 26 and cathode 25 by conductors 71, 81, and 76. A condenser 80 is connected between grid 31 and cathode 29 by conductors 74, 81, and 77. The biasing means for the grids is connected between the center tap 65 of secondary winding 64 and conductor 81 leading to the two cathodes 25 and 29. The biasing means will now be described.

The biasing means comprises two different portions, one for providing a steady bias and the other for providing a pulsing voltage during certain cycles of the signal voltage. The means for providing a steady voltage comprises a battery 82 connected to a group of parallel potentiometers 83, 84, and 85. The three potentiometers are provided for simultaneously biasing several amplifier circuits as will be more thoroughly described later. The potentiometer 85 is the one associated with the particular amplifier being considered and comprises a resistor 86 and a slider 87. The potentiometers 83 and 84 comprise resistors 89 and 90 and sliders 91 and 92, respectively. The three resistors 89, 90, and 86 of the potentiometers are connected together by conductors 94, 95, 96, and 97. The junction of conductors 94 and 95 is connected by conductor 98, resistor 99, and conductor 100 to the negative terminal of the battery 82. The junction of conductors 96 and 97 is connected by conductors 102 and 103 to ground at 104 and by conductors 102 and 105, resistor 106 and conductor 107 to the positive terminal of battery 82. Thus, the resistors 86, 89, and 90 are connected across the terminals of battery 82 with the upper terminals negative with respect to the lower terminals.

Each of the sliders 91, 92, and 87 is connected to one terminal of a further potentiometer, these further potentiometers being indicated by the reference numerals 110, 111, and 112. The potentiometer 110 comprises a resistor 113 and a slider 114. The potentiometer 111 comprises a resistor 115 and a slider 116. The potentiometer 112 consists of a resistor 117 and a slider 118. Again, the three potentiometers are to provide for supplying biasing voltages to three different amplifiers, only one of which is shown in the drawing. The taps 91, 92, and 87 of potentiometers 83, 84, and 85 are connected to the lower terminals of resistors 113, 115, and 117 by conductors 121, 122, and 123, all respectively. The upper terminals of the three resistors 113, 115, and 117 are connected together by conductors 124 and 125, and are connected to one terminal of a variable resistor 128. The opposite terminal of the variable resistor 128 is connected through a conductor 129 to the cathode of an electronic discharge device 131.

The electronic discharge device 131 consists of an anode 132, a control grid 133, and a cathode 134. A resistor 135 is connected between the grid 133 and the cathode 134 by conductors 136 and 137, and a condenser 138. The junction of resistor 135 and condenser 138 is connected to ground at 139.

A condenser 141 and a resistor 142 are connected in series across the secondary 52 in a circuit extending as follows: from the upper terminal of secondary 52 through conductor 143, condenser 141, conductors 144 and 145, resistor 142, conductor 146, ground connections 147 and 148, and conductor 149 to the other terminal of secondary 52. The anode 132 of tube 131 is connected to the junction of conductors 144 and 145 leading to condenser 141 and resistor 142, respectively, by conductor 150. Condenser 141 and resistor 142 act to cause a shift in phase of the voltage applied to the anode 132 of tube 131, the tube being effectively connected in parallel with the resistor 142.

While the invention is in no way limited to the use of elements having any particular value, in one particular embodiment, I found it desirable to employ condensers having a capacitance of 0.05 microfarad for condensers 141 and 138. In the same embodiment, resistor 142 had a resistance of 10,000 ohms and resistor 135 a resistance of 50,000 ohms. The variable resistor 128 had a maximum resistance of 0.5 megohm and the resistors of potentiometers 110, 111, and 112, resistances of 0.1 megohm. Each of the resistors of potentiometers 83, 84, and 85 had a resistance of 1,000 ohms and resistors 99 and 106 each had a resistance of 200 ohms. The source of power available was a 10 cycle source. A type 2050 tube with its shield grid connected to the cathode was used for tube 131. A 24 volt battery was employed for battery 82. While these values are given as illustrative, it is to be understood that other values of elements could be employed.

*Operation*

The various elements are shown in the position that they assume when the control system is balanced. With the elements in this position, the resistance bridge consisting of potentiometers 20 and 38 is balanced by reason of sliders 19 and 40 occupying corresponding positions on their respective resistances. As a result, there is no potential difference between sliders 19 and 40, and no voltage is supplied to the primary 61 of coupling transformer 60. This in turn results in the grids 26 and 31 being subjected only to the voltages impressed upon the tubes by means of the biasing apparatus. The operation of this portion of the system will now be described.

The grids 26 and 31 are each connected to their associated cathodes through a circuit which includes half of the secondary 64 and a path extending from the center tap 65 of secondary 64 to the junction of conductors 76 and 77 leading to the cathodes 25 and 29, respectively, this circuit from center tap 65 being as follows: center tap 65 through conductor 155, slider 118, the lower portion of resistor 117, conductor 123, slider 87, the lower portion of resistor 86, conductors 97, 102, 103, and ground connections 104 and 78 to the junction of conductors 76 and 77. It is noted that this connection includes the lower portion of resistor 117 and the portion of resistor 86 between the slider 87 and the lower terminal of resistor 86. As previously noted, the battery 82 is connected across resistor 86 so that there exists between the slider 87 and the lower terminal of resistor 86 a voltage corresponding to the position of slider 87. Furthermore, since the negative terminal of battery 82 is connected to the upper end of resistor 86, the slider 87 will be negative with respect to the lower terminal of resistor 86. Since the lower terminal of the resistor is connected to the cathode and the upper terminal through resistor 117 to the grids, it will be obvious that the effect of this voltage is to bias grids 26 and 31 negatively.

As previously noted, the anode and cathode of tube 131 are connected in parallel with resistor 142 which in turn is in a circuit including the high voltage secondary 52 and condenser 141. Consequently, the alternating voltage across resistor 142, which slightly leads in phase the voltage across secondary 52, is always impressed across the anode and cathode of tube 131. The condenser 138, being connected between the grid and cathode, as previously explained, determines the biasing voltage impressed upon grid 133 and hence determines whether the tube 131 is conductive. Condenser 138 has at all times impressed on it a voltage which is dependent upon the position of sliders 91, 92 and 87, being connected across the lower portions of the three potentiometers with which these sliders are associated. Thus, a circuit including condenser 138 exists as follows: from the lower terminal of resistor 86 through conductors 97, 102 and 103, ground connections 104 and 139, condenser 138, conductor 129, resistor 128, conductor 125, resistor 117, and conductor 123 to slider 87. Since the portion of resistor 86 between slider 87 and the lower terminal thereof has always impressed across it a direct current voltage, the polarity of slider 87 being negative with respect to the lower terminal of resistor 86, it will be obvious that the effect of the circuit just traced is to continually impress on condenser 138 a voltage tending to make the lower terminal of condenser 138 positive with respect to the upper terminal. Thus, the grid 133 tends to be maintained slightly positive with respect to cathode 134 so that as far as the effect of the circuits just traced are concerned, the tube 131 is conductive, the discharge circuit thereof being as follows: from the junction of conductors 144 and 145 through conductor 150, anode 132, cathode 134, condenser 138, and ground connections 139 and 147. As soon as tube 131 discharges through the circuit just traced, the resistance of tube 131 drops to a very low value so that substantially the full voltage between the junction of conductors 144 and 145 and ground is impressed on condenser 138. The polarity of this voltage is opposite to that impressed upon it by the battery 82 and the potentiometers 83, 84, and 85. In other words, the effect of the discharge is to render the upper terminal of the condenser highly positive with respect to the lower terminal and to impose a very highly negative bias on the grid 133. The effect of this bias is to cause the discharge to terminate at the end of the half cycle in which the tube is fired. Upon the occurrence of the next half cycle in which the anode 132 is positive with respect to the cathode 134, the condenser 138 imposes such a highly negative voltage upon the grid 133 that the tube 131 cannot discharge.

As soon as condenser 138 becomes charged in the manner just described, the charge begins to leak off through the following circuit: from the upper terminal of condenser 138 through conductor 129, resistor 128, the three resistors 113, 115, and 117, the lower portions of resistors 89, 90, and 86, conductors 102 and 103, and ground connections 104 and 139 to the lower terminal of condenser 138. The resistance in this discharge circuit is sufficiently high that an appreciable time is required for the discharge of condenser 138. The length of this time can be varied by varying the value of adjustable resistor 128. In one preferred embodiment of my invention, I have maintained the resistors so adjusted that the tube 131 is able to discharge every other cycle. In some cases, however, it is desirable to have it discharge less frequently, for example, once every four cycles.

Due to the discharge circuit for condenser 138 traced above, a portion of the voltage across condenser 138 is impressed across resistors 113, 115, and 117. It will be recalled that in the biasing circuit traced for the grids 26 and 31 of tubes 23 and 24, the lower portion of resistor 117 was included. Thus, the voltage impressed across the lower portion of resistor 117 as well as across the lower portion of resistor 86 is impressed upon grids 26 and 31. However, the voltage impressed on the lower portions of resistors 117 and 86 by condenser 138 raises the potentials of slider 118 and slider 87 in the positive direction with respect to the lower terminals of their resistors. In other words, the effect of this voltage is opposite to that of battery 82. Thus, during that half cycle in which tube 131 is discharging, the bias voltage introduced by battery 82 is opposed by the voltage applied by condenser 138. By proper adjustment of the slider 118, the amount of voltage introduced by condenser 138 can be adjusted so that the effective negative biasing voltage applied to grids 26 and 31 will still be slightly greater than the value at which these tubes become conductive.

Now let it be assumed that the condition to which controller 41 is responsive changes so as to cause a movement of the slider 40 very slightly to the right. This will cause a very slight unbalance voltage to be applied to the primary 61 of the coupling transformer 60. This slight unbalance voltage will be applied to the grids 26 and 31 in addition to the biasing voltages introduced by the biasing portion of the apparatus just described. The phase relation of this unbalance voltage to the voltage supplied to the anodes will be dependent upon the relation of windings 52 and 53. Let it be assumed that the phase relation is such that during the half cycle when anodes 27 and 32 are positive with respect to cathodes 25 and 29, the effect of the unbalance voltage is to tend to render grid 26 positive with respect to cathode 25. Under these conditions, since grid 31 is connected to the opposite end of the secondary winding 64, the effect of the same unbalance voltage would be to render grid 31 negative with respect to cathode 29 during the same half cycle. Thus, the tendency of the unbalance voltage, assuming the conditions described, is to render tube 23 conductive and to render tube 24 non-conductive. However, the grids 26 and 31 are also subjected to the biasing voltage of the biasing portion of the apparatus. Now let it be assumed that the signal caused by the movement to the right of slider 40 is of such magnitude that the voltage impressed by reason of it on grid 26 is just able to raise the grid above the cut-off voltage when the biasing voltage consists not only of the component introduced by battery 82 but the opposing component introduced by reason of the discharge of tube 131, but is insufficient to raise the grid above the cut-off voltage when the biasing voltage consists only of the component introduced by battery 82. Under these conditions, tube 23 will be conductive during each cycle in which tube 131 discharges, for example, every other cycle. As a result of this discharge, current will flow through clutch winding 16 as follows: from the upper terminal of secondary 52 through conductors 143 and 160, electromagnetic clutch winding 16, conductor 161, anode 27, cathode 25, conductor 76, ground connections 78 and 148, and conductor 149 to the lower terminal of secondary 52. Thus, the effect of the unbalance signal is to cause the clutch winding 16 to be energized so as to cause rotation of shaft 17 in one direction. Since, however, the unbalance signal is very small, clutch 16 will be only energized every other cycle so that the rotation of shaft 17 will be relatively slow.

The effect of rotation of shaft 17 is to cause slow movement of the controlled device. At the same time, the slider 19 is moved to the right so as to tend to cause the positions of sliders 19 and 40 to be again the same. Due to the very slight movement of slider 40 which causes the original unbalance of the bridge, only a small amount of movement of the control device and slider 19 are necessary to again rebalance the bridge. The controlled device will now be in a position corresponding to that of the controller and the balanced conditions described at the beginning of the operation will again exist.

Now let it be assumed that the condition to which the controller is responsive deviates slightly in the opposite direction so as to cause the controller to move slider 40 to the left. The unbalance voltage will now be 180 degrees displaced in phase from that previously considered so that during the half cycle in which the anodes 27 and 32 are positive with respect to cathodes 25 and 29, the effect of the unbalance voltage will be to tend to cause grid 31 to be positive with respect to cathode 29 while the effect on grid 26 is to tend to cause it to be negative with respect to the cathode. Let it be assumed that the movement of slider 40 to the left causing this unbalance voltage is substantially the same in magnitude as the previously described movement of slider 40 to the right. The unbalance voltage hence will be substantially the same in magnitude so that again the effect of the unbalance voltage is unable to overcome the biasing effect of battery 82 alone but is able to overcome the effect of battery 82 when the latter is opposed by the voltage introduced by condenser 138. Hence, during those half cycles in which tube 131 is discharging, the grid 31 will assume a potential sufficiently high with respect to that of the cathode 29 to cause tube 24 to be conductive. The result of this will be the establishment of a circuit through clutch winding 15 as follows: from the upper terminal of secondary 52 through conductors 143 and 160, clutch winding 15, conductor 163, anode 32, cathode 29, conductor 77, ground connections 78 and 148, and conductor 149 to the lower terminal of secondary 52.

The effect of the establishment of the circuit just traced is to cause the clutch associated with winding 15 to be energized so as to cause shaft 17 to rotate in the direction opposite to that previously considered. This will in turn cause movement of the controlled device 18 and the slider 19 in the opposite direction, slider 19 now being moved to the left. Again, due to the slight movement of slider 40 to the left, only a slight movement of controlled device 18 and slider 19 will be necessary to rebalance the bridge and stop movement of the controlled device. Again, due to the fact that tube 24 is conductive only during certain cycles, the movement of the controlled device 18 will be very gradual.

Now let it be assumed again that the slider 40 moves to the right but that the movement is rather substantial due to a substantial change in the condition to which controller 41 is responsive. Under these conditions, the phase of the voltage will again be such as to render tube 23 conductive. The magnitude of the unbalance voltage, however, will now be sufficient to overcome the bias introduced by battery 82 even during those cycles when the tube 131 is not conductive. Thus, the tube 23 will be conductive during each half cycle so that the winding 16 is energized each cycle. The movement of shaft 17 and hence of controlled device 18 will accordingly be more rapid than before. Let it be assumed, for example, that the resistor 128 is adjusted so that tube 131 discharges every other cycle. In this case, the movement of shaft 17 will be twice as fast as when only the slight amount of unbalance of the bridge occurred. Hence, while the deviation is greater, the rate at which it is readjusted is also greater so as to cause a quick adjustment of the controlled device despite the greater deviation.

It will be obvious from the above description that if a substantial deviation of the condition occurs in the opposite direction so as to cause slider 40 to move a substantial distance to the left, the clutch winding 15 will be energized each cycle instead of each half cycle as described. Again, the movement of controlled device 18 will be at a more rapid rate.

It was noted above that the tube 131 is subjected to the voltage across resistor 142 which is slightly leading in phase to that existing across secondary 52. The reason for this is that it is desirable for the peaking voltage introduced by reason of the discharge of tube 131 and the resultant charge of condenser 138 to occur only slightly after the beginning of the positive cycle of the plate voltage, despite the delay in the build up of this voltage caused by condenser 138. Were plate 132 connected directly to the upper terminal of secondary 52, the anode 132 would become positive at the same instant as anode 32 so that by the time the condenser became charged up the peaking voltage would be impressed on the grids at the latter portion of the conductive half cycle rather than at the beginning thereof.

As previously noted, the potentiometers 83 and 84 as well as the potentiometers 110 and 111 are provided for taking care of other amplifiers. In a complex system utilizing a plurality of balanced bridges each with its own amplifier, it is undesirable to provide a separate biasing arrangement for each amplifier. By the arrangement shown in the drawing, it is possible to simultaneously supply all of the amplifiers with both a biasing voltage and a peaking voltage without any danger of signals being introduced from one system to the other to cause undesired discharge of the highly sensitive gas filled tubes.

The transformer 60 having a primary 61 with a grounded center tap 62 performs a very desirable function in eliminating transient effects which might equally affect grids 26 and 31. There is a tendency for transient voltages of a type commonly referred to as "longitudinals" to travel down the opposite leads to the grids of both tubes and cause them to discharge even though no signal voltage is present. These transient voltages are of relatively high frequency, being introduced through the source of power or being produced in the amplifier circuits as a result of the sudden discharge of the tubes, particularly tube 131. By reason of their high frequency, they are conducted between windings of transformer 50 by reason of the capacity effect between the windings. Thus, if transformer 60 were not present, one such current would travel from the transformer through conductor 56, conductor 67, conductor 69, resistor 70, and conductor 71, to grid 26. The other would travel through conductors 55, 68, and 72, resistor 73, and conductor 74 to grid 31. The voltages associated with these currents would be in phase with each other and would under certain conditions cause simultaneous firing of the tubes. By placing the coupling transformer 60 into the connections and by grounding the center tap of primary 61, this difficulty is eliminated. The current traveling down line 67, for example, will travel through the upper portion of winding 61 and pass to grounded tap 62. The current traveling along conductor 68 will pass through the lower portion of primary winding 61 to ground at 62. Since the two currents are in phase with each other, the effects of these currents on the total voltage across the primary will be in opposition so that no effect whatsoever will be produced by them in the secondary 64. This feature is of particular importance in connection with an amplifier of the high sensitivity made possible by the biasing means described above in which the tubes are caused to fire upon the presence of extremely slight unbalance voltages. With such a system in which a pulsing voltage is introduced during certain predetermined cycles, the effect of transient voltages such as the "longitudinals" just considered is more pronounced since obviously such a longitudinal occurring during a cycle in which the pulsing voltage is applied is much more apt to cause the discharge of both tubes than in a more conventional type of system in which a greater signal is required to cause discharge of the tubes.

It will be seen that I have provided an extremely sensitive amplifier in which the presence of all moving elements is entirely eliminated. While I have shown a specific embodiment of my invention for purposes of illustration, it is to be understood that the invention is to be limited only by the scope of the appended claims.

I claim as my invention:

1. In combination, a pair of electronic discharge devices each having an input and an output circuit, means for applying an alternating voltage to the output circuits of both devices, means for producing an alternating signal voltage of the same phase or the opposite phase to that of the output voltage dependent upon the condition of a main controller, means for applying to the input circuits of said two tubes alternating voltages which are opposite in phase to each other but both of a phase dependent upon that of said signal voltage so that one or the other of said discharge devices tends to be conductive, and means including an electronic timer for applying a further biasing voltage of the same polarity to both of said input circuits during a portion of the cycles of said alternating signal voltage.

2. In combination, a pair of electronic discharge devices each having an input and an output circuit, means for applying an alternating voltage to the output circuits of both devices, means for producing an alternating signal voltage of the same phase or the opposite phase to that of the output voltage dependent upon the condition of a main controller, means including a coupling transformer for applying to the input circuits of said two tubes alternating voltages which are opposite in phase to each other but both of a phase dependent upon that of said signal voltage so that one or the other of said discharge devices tends to be conductive, and means including an electronic timer for applying a further biasing voltage of the same polarity to both of said input circuits during a portion of the cycles of said alternating signal voltage, the primary winding of said coupling transformer having a center tap connected to ground so as to balance out in said primary winding any transient voltages existing between the terminals of said primary winding and ground.

3. In combination, a pair of electronic discharge devices each having an input and an output circuit, means for applying an alternating voltage to the output circuits of both devices, means for producing an alternating signal voltage of the same phase or the opposite phase to that of the output voltage dependent upon the condition of a main controller and tending to include undesirable transient voltage, and means including a coupling transformer having a primary winding connected to said signal voltage producing means and secondary winding means connected to the input circuits of said two discharge devices for applying to the input circuits of said two discharge devices alternating voltages which are opposite in phase to each other but both of a phase dependent upon that of said signal voltage so that one or the other of said discharge devices tends to be conductive, the primary winding of said coupling transformer having a center tap connected to ground so as to balance out in said primary winding any such transient voltages in said signal voltage producing means conducted to the terminals of said primary winding and applied between said terminals and ground.

4. In combination, an electronic amplifier having an input circuit and an output circuit, means including means responsive to a condition for applying a signal voltage variable in magnitude to said input circuit, the magnitude over a range of values of said signal voltage being dependent upon the value of said condition, means for applying a fixed biasing voltage to said input circuit so that said amplifier is conductive only if said signal voltage is greater than a predetermined magnitude, and means including an electronic timer for periodically adding to said input circuit a further voltage of short duration tending to render said amplifier conductive but said further voltage being of such limited magnitude as to cause said amplifier to be conductive only when the magnitude of said signal voltage is above a predetermined value lower than said first named predetermined magnitude.

5. In combination, an electronic amplifier having an input circuit and an output circuit, signal means adapted to be energized from an alternating source of power for applying an alternating signal voltage variable in magnitude over a range of values to said input circuit, means adapted to be energized from the same alternating source of power as said signal means for applying a further adjustable voltage to said input circuit to render said amplifier conductive only if said signal voltage is above a predetermined magnitude, and means including a condenser for periodically interrupting the application of said further voltage for a predetermined number of cycles of said alternating signal voltage so that said amplifier is conductive during said cycles only if said signal voltage is above a second higher predetermined magnitude.

6. In combination, an electronic amplifier having an input circuit and an output circuit, signal means adapted to be energized from an alternating source of power for applying an alternating signal voltage variable in magnitude over a range of values to said input circuit, means adapted to be energized from the same alternating source of power as said signal means for applying a further adjustable voltage to said input circuit beginning with a predetermined portion of a cycle of said alternating signal voltage to render said amplifier conductive only if said signal voltage is above a predetermined magnitude, and means including a condenser for periodically interrupting the application of said further voltage for a predetermined number of cycles of said alternating signal voltage so that said amplifier is conductive during said cycles only if said signal voltage is above a second higher predetermined magnitude.

7. In combination, an electronic discharge device of the gas filled type having an anode, a cathode, and a control element, means for applying a signal voltage of variable magnitude between said control element and cathode, means for applying a direct current biasing voltage between said control element and cathode of such magnitude as to prevent said discharge device from being conductive unless the magnitude of said signal voltage is above a first predetermined value, and means including an electronic timer including an impedance network for producing a voltage drop across said impedance network to produce a periodic voltage acting in opposition to said direct current biasing voltage for periodically decreasing the magnitude of said biasing voltage sufficiently that said discharge device is conductive at a lower value of said signal voltage but not sufficiently to render said discharge device conductive in the absence of a signal voltage.

8. In combination, an electronic discharge device of the gas filled type having an anode, a cathode, and a control element, means for applying a signal voltage of variable magnitude between said control element and cathode, means for applying a direct current biasing voltage between said control element and cathode of such magnitude as to prevent said discharge device from being conductive unless the magnitude of said signal voltage is above a first predetermined value, and an electronic timer including an impedance network for producing a voltage drop across said impedance network to produce a periodic voltage acting in opposition to said direct current biasing voltage for periodically decreasing the magnitude of said biasing voltage sufficiently that said discharge device is conductive at a lower value of said signal voltage but not sufficiently to render said discharge device conductive in the absence of a signal voltage, said impedance means including a condenser and said timer further including an electronic discharge device for periodically charging said condenser at intervals less frequent than the cycles of said signal voltage.

9. In combination, an electronic discharge device of the gas filled type having an anode, a cathode, and a control element, means for applying a voltage between said anode and cathode, means for applying a signal voltage of variable magnitude between said control element and cathode, means for applying a biasing voltage between said control element and cathode of such magnitude as to prevent said discharge device from being conductive unless the magnitude of said signal voltage is above a first predetermined value, and means including an electronic timer for periodically decreasing the magnitude of said biasing voltage sufficiently that said discharge device is conductive at a lower value of said signal voltage but not sufficiently to render said discharge device conductive in the absence of a signal voltage, said electronic timer comprising a condenser and an electronic discharge device having a cathode circuit, which includes said condenser, and having an input circuit and an output circuit both of which are common to said cathode circuit and said condenser, said discharge device being operative to periodically charge said condenser at intervals dependent upon the rate of discharge of said condenser.

10. In combination, an electronic discharge device having an anode, a cathode, and a control element, means for applying a signal voltage variable in magnitude between said control element and cathode, means including a resistor for applying a direct current biasing voltage between said control element and cathode tending to render said discharge device non-conductive except when the magnitude of said signal voltage is above a first predetermined magnitude, and means including an electronic timer including an impedance network for producing a voltage drop across said impedance network to produce a periodic voltage acting in opposition to said direct current biasing voltage for periodically applying a further direct current voltage in opposition to said biasing voltage to decrease the magnitude of signal voltage necessary to cause the discharge device to be conductive.

11. In combination, an electronic discharge device have an anode, a cathode, and a control element, means for applying a voltage between said anode and cathode, means for applying a signal voltage variable in magnitude between said control element and cathode, means including a resistor for applying a biasing voltage between said control element and cathode tending to render said discharge device non-conductive except when the magnitude of said signal voltage is above a first predetermined magnitude, and an electronic timer for periodically applying a voltage in opposition to said biasing voltage to decrease the magnitude of signal voltage necessary to cause the discharge device to be conductive, said electronic timer including a condenser, an electronic discharge device having a cathode circuit including said condenser for charging said condenser at intervals whose length is determined by the rate of discharge of said condenser, and a discharge circuit for said condenser including said resistor of said biasing means.

12. In combination, an electronic discharge device having an anode, a cathode, and a control element, means for applying a voltage between said anode and cathode, means for applying a signal voltage variable in magnitude between said control element and cathode, means including a resistor for applying a biasing voltage between said control element and cathode tending to render said discharge device non-conductive except when the magnitude of said signal voltage is above a first predetermined magnitude, and an electronic timer for periodically applying a voltage in opposition to said biasing voltage to decrease the magnitude of signal voltage necessary to cause the discharge device to be conductive, said electronic timer including a condenser, an electronic discharge device having a cathode circuit including said condenser for charging said condenser at intervals whose length is determined by the rate of discharge of said condenser, and a discharge circuit for said condenser including said resistor of said biasing means and a variable resistor for varying the discharge rate of the condenser.

13. In combination, an electronic discharge device of the gas filled type having an anode, a cathode, and a control element, means for applying a voltage between said anode and cathode, means for applying a signal voltage of variable magnitude between said control element and cathode, means for applying a biasing voltage between said control element and said cathode of such magnitude as to prevent said discharge device from being conductive unless the magnitude of said signal voltage is above a first predetermined value, and timing means for periodically modifying the magnitude of said biasing voltage so as to require a different value of said signal voltage for said discharge device to be conductive, said timer means including a condenser, and a gas filled electronic discharge device having a cathode circuit including said condenser, said gas filled electronic discharge device controlled by the charge on said condenser for charging said condenser at intervals dependent upon the discharge rate of said condenser.

14. In combination, an electronic amplifier having an input circuit and an output circuit, means adapted to be energized from a source of cyclically varying power for applying a cyclically varying voltage to said output circuit, means adapted to be energized from the same source of cyclically varying power for applying to said input circuit a cyclically varying signal voltage variable in magnitude and related in phase to the voltage applied to said output circuit, a source of biasing voltage, means connecting said biasing voltage to said input circuit, and means including an electron discharge device and an impedance network for producing a voltage drop across said impedance network to produce a voltage acting in opposition to said biasing voltage for abruptly adding to said biasing voltage a further voltage to change biasing effect of said biasing means on said input circuit sufficiently that said amplifier will be operative for over only a variable number of its operating cycles when said signal voltage is in one range of values and to be ineffective to maintain said amplifier operative or inoperative when said signal voltage is respectively greater than or less than said one range of values.

15. In combination, an electronic discharge device of the gas filled type having an anode, a cathode, and a control element, means for applying a signal voltage of variable magnitude between said control element and cathode, a cyclically varying power supply, means operatively connecting said power supply to said anode and cathode, means for applying a biasing voltage between said control element and cathode of such magnitude as to prevent said discharge device from being conductive unless the magnitude of said signal voltage is above a first predetermined value, and means including an electronic timer including an impedance network for producing a voltage drop across said impedance network to produce a periodic voltage acting in opposition to said biasing voltage for periodically abruptly adding to said biasing voltage a further voltage to change the biasing effect of said biasing means sufficiently that said discharge device will be rendered conductive over only a variable number of its operating cycles when said signal voltage varies between said first predetermined value and a second predetermined value below said first predetermined value and said discharge device will remain inoperative when said signal voltage is below said second predetermined value.

16. In combination: an electronic amplifier having an input circuit and an output circuit; means adapted to be energized from a source of cyclically varying power for applying a cyclically varying voltage to said output circuit; means adapted to be energized from the same source of cyclically varying power for applying to said input circuit a cyclically varying signal voltage variable in magnitude and related in phase to the voltage applied to said output circuit, said signal voltage being effective when above a predetermined magnitude to cause said amplifier to be conductive; a source of direct current biasing voltage; means connecting said biasing voltage to said input circuit; an impedance network; and means including an electronic discharge device adapted to be energized from the same source of cyclically varying power as said previously named means and effective when so energized to produce a voltage drop across said impedance network to produce a periodic voltage to modify said direct current biasing voltage on said input circuit during a predetermined portion of the cycles of said signal voltage, said modified direct current biasing voltage being of such character as to tend to render said amplifier conductive but of such limited magnitude that said amplifier is conductive only in the event of a signal voltage of a magnitude above a predetermined value which is lower than said first named predetermined magnitude.

17. In combination: an electronic discharge device of the gas filled type having an anode, a cathode, and a control element; means for applying a cyclically varying voltage between the anode and cathode of said device; means for applying between the control element and cathode a cyclically varying signal voltage variable in magnitude and related in phase to the previously named voltage, said signal voltage being effective when above a predetermined magnitude to cause said discharge device to be conductive; a source of direct current biasing voltage; means connecting said biasing voltage between said control element and said cathode; and means including an electronic timer including an impedance network to produce a voltage drop thereacross to produce a periodic voltage for modifying said direct current biasing voltage for a time period of short duration during certain of the cycles of said signal voltage, said modified direct current biasing voltage being of such character as to tend to render said discharge device conductive but of such limited magnitude that said device is conductive only in the event of a signal voltage of a magnitude above a predetermined value which is lower than said first named predetermined magnitude.

18. In combination: an electronic discharge device of the gas filled type having an anode, a cathode, and a control element; means for applying a cyclically varying voltage between the anode and cathode of said device; means for applying between the control element and cathode a cyclically varying signal voltage variable in magnitude and related in phase to the previously named voltage, said signal voltage being effective when above a predetermined magnitude to cause said discharge device to be conductive; a source of direct current biasing voltage; means connecting said biasing voltage between said control element and said cathode; and means including an electronic timer including impedance network for producing a voltage drop across said impedance network to produce a periodic voltage for modifying said direct current biasing voltage for a time period of short duration during certain of the cycles of said signal voltage, said modified direct current biasing voltage of short duration being of such character as to tend to render said discharge device conductive but of such limited magnitude that said device is conductive only in the event of a signal voltage of a magnitude above a predetermined value which is lower than said first named predetermined magnitude, said last named means including a condenser and an electronic discharge device for charging said condenser at periodic intervals less frequent than the cycles of said signal voltage.

DAVID L. MARKUSEN.

REFERENCES CITED

The following references are of record in the file of this patent:

UNITED STATES PATENTS

| Number | Name | Date |
|---|---|---|
| 1,938,742 | Demarest | Dec. 12, 1933 |
| 2,026,308 | Ganz | Dec. 31, 1935 |
| 2,190,514 | Garman | Feb. 13, 1940 |
| 2,253,129 | Lord | Aug. 19, 1941 |
| 2,332,325 | Levoy, Jr. | Oct. 19, 1943 |

Certificate of Correction

Patent No. 2,510,707

June 6, 1950

DAVID L. MARKUSEN

It is hereby certified that error appears in the printed specification of the above numbered patent requiring correction as follows:

Column 2, line 31, for "idirectly" read *indirectly*; column 10, lines 60 and 61, strike out "over a range of values" and insert the same in line 59, after the word "magnitude";

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*